United States Patent
Woo et al.

(10) Patent No.: US 8,182,579 B2
(45) Date of Patent: May 22, 2012

(54) SYSTEM AND METHOD FOR DETERMINING AIR PURIFIER FILTER CHANGE TIME USING MEASUREMENT OF MOTOR SPEED

(75) Inventors: Mu Seon Woo, Seoul (KR); Byoung Phil Lee, Seoul (KR); Hyung Gon Kim, Seoul (KR)

(73) Assignee: Woongjin Coway Co., Ltd., Choongcheongnam-Do (KR)

( * ) Notice: Subject to any disclaimer, the term of this patent is extended or adjusted under 35 U.S.C. 154(b) by 403 days.

(21) Appl. No.: 12/494,220

(22) Filed: Jun. 29, 2009

(65) Prior Publication Data

US 2010/0001677 A1    Jan. 7, 2010

(30) Foreign Application Priority Data

Jul. 2, 2008   (KR) .................. 10-2008-0063988
May 11, 2009   (KR) .................. 10-2009-0040747

(51) Int. Cl.
   *B01D 46/30*   (2006.01)
   *B01D 49/00*   (2006.01)
   *G05B 5/00*    (2006.01)
(52) U.S. Cl. .............. 95/26; 95/25; 96/424; 318/461
(58) Field of Classification Search .............. 318/461; 95/25, 26; 96/424
   See application file for complete search history.

(56) References Cited

U.S. PATENT DOCUMENTS

| | | | | |
|---|---|---|---|---|
| 4,717,402 A | * | 1/1988 | Lutterbach et al. | 55/467.1 |
| 4,726,824 A | * | 2/1988 | Staten | 96/417 |
| 4,824,450 A | * | 4/1989 | Howard | 96/421 |
| 5,810,908 A | * | 9/1998 | Gray et al. | 95/25 |
| 5,893,939 A | * | 4/1999 | Rakocy et al. | 55/471 |
| 6,239,694 B1 | | 5/2001 | Honda et al. | |
| 6,491,735 B2 | * | 12/2002 | Najm | 55/492 |
| 6,894,620 B2 | | 5/2005 | Reinhardt et al. | |
| 7,001,451 B2 | * | 2/2006 | Kim | 96/415 |
| 7,261,762 B2 | * | 8/2007 | Kang et al. | 95/1 |
| 2002/0078830 A1 | * | 6/2002 | Chung et al. | 96/424 |
| 2008/0014853 A1 | | 1/2008 | Kim | |
| 2009/0038480 A1 | * | 2/2009 | Garman et al. | 96/414 |

FOREIGN PATENT DOCUMENTS

| | | |
|---|---|---|
| DE | 100 19 607 A1 | 11/2000 |
| DE | 10 2006 055 603 A1 | 6/2007 |
| EP | 1 285 686 A1 | 2/2003 |
| EP | 1 800 919 A2 | 6/2007 |
| JP | 10-309422 A | 11/1998 |
| JP | 2000-325720 | 11/2000 |
| JP | 2002-062589 | 2/2002 |
| JP | 2002-102596 | 4/2002 |
| JP | 2005-106322 | 4/2005 |
| KR | 100721458 | 5/2007 |

* cited by examiner

*Primary Examiner* — Walter Benson
*Assistant Examiner* — Gabriel Agared
(74) *Attorney, Agent, or Firm* — McDermott Will & Emery LLP (57) ABSTRACT

A system and a method are disclosed for changing a filter provided in an air purifier at an optimum time by measuring the rotational speed of a motor that operates the filter. The system for determining an air purifier filter change time includes: a motor speed measurement unit; a time counting unit; a speed determination unit; a time comparison unit; and a filter change time determination unit.

8 Claims, 9 Drawing Sheets

SYSTEM AND METHOD FOR DETERMINING AIR PURIFIER FILTER CHANGE TIME USING MEASUREMENT OF MOTOR SPEED

CROSS-REFERENCE TO RELATED APPLICATIONS

This application claims the priority of Korean Patent Application Nos. 2008-0063988 filed on Jul. 2, 2008 and 2009-0040747 filed on May 11, 2009, in the Korean Intellectual Property Office, the disclosure of which is incorporated herein by reference.

BACKGROUND OF THE INVENTION

1. Field of the Invention

The present invention relates to a system and method for determining an air purifier filter change time using a measurement of a motor speed and, more particularly, to a system and method for changing an air purifier filter provided in an air purifier at a proper time by measuring the rotational speed of the motor that operates the filter.

2. Description of the Related Art

In general, an air purifier is a device for purifying indoor air by removing dust and germs included in indoor air or deodorizing tobacco smoke, the smell of sweat, or the like.

Air purifiers generally suck in contaminated air through the action of a fan, collect and remove fine dust particles or germs of up to 0.03 μm by means of a filter and generate anions that have been reduced due to contaminated indoor air in order to provide an agreeable indoor environment.

Figure 1:
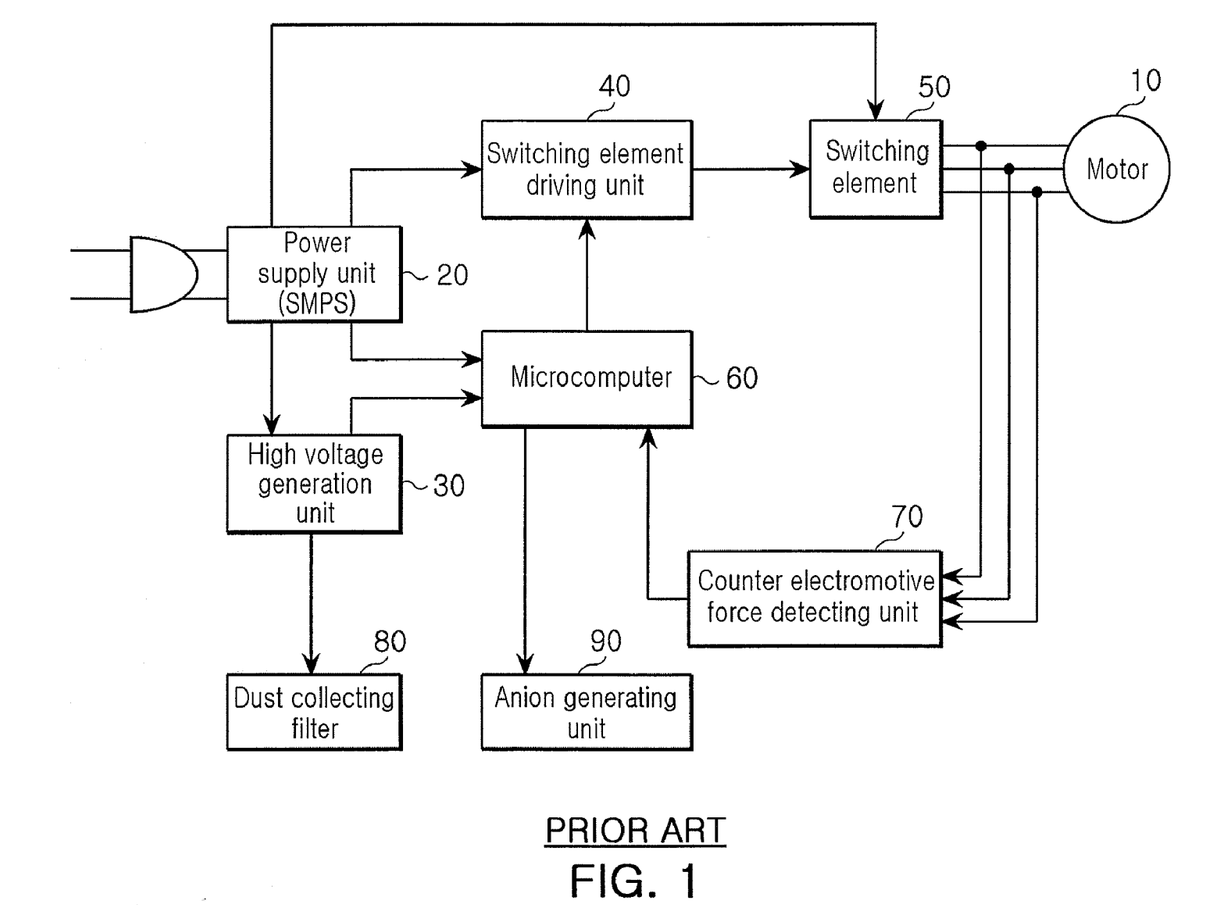
FIG. 1 is a schematic block diagram of a motor driving system provided in the related art air purifier.

FIG. 1 is a schematic block diagram of a motor driving system provided in the related art air purifier. As shown in FIG. 1, a power supply unit 20 is formed as a switching mode power supply (SMPS) or the like to convert an AC voltage, commercial power, into a DC voltage. A switching element driving unit 40 generates a switching control signal upon receiving the DC voltage which has been converted by the power supply unit 20. A switching element 50 converts the DC voltage applied from the power supply unit 20 into a three-phase voltage according to a switching control signal, and applies the converted voltage to a motor 10.

A coil (not shown) of the motor 10 generates a magnetic field by the three-phase voltage to rotate a rotor (not shown) of the motor 10. As the rotor of the motor 10 is rotated, a compressor (not shown) is driven.

A counter-electromotive force is output to the coil according to the rotation of the rotor of the motor 10, and a counter-electromotive force detection unit 70 detects the counter-electromotive force and applies it to a microcomputer 60. Upon detecting the counter-electromotive force, the microcomputer 60 controls the switching element driving unit 40 to allow the motor 10 to be accurately operated.

The DC voltage which has been converted by the power supply unit 20 is supplied to a high voltage generation unit 30. Then, the high voltage generation unit 30 generates a high voltage, and a dust collecting filter 80 collects dust by using the high voltage input from the high voltage generation unit 30. The DC voltage which has been converted by the power supply unit 20 is supplied to the microcomputer 60. Upon receiving the DC voltage, the microcomputer 60 performs functions such as air volume adjustment (or airflow adjustment), displaying degree of air contamination, timer correction, anion generation, and the like. An anion generation unit 90 induces a negative (−) high voltage together with the high voltage generation unit 30 and supplies the corresponding output to an anion generating needle to discharge anions.

The voltage applied to the motor 10 has a pulse width modulation (PWM) waveform, and if its duty ratio is high, the driving force of the motor 10 becomes stronger, whereas if the duty ratio is low, the driving force of the motor 10 is weak. A driving circuit of the motor 10 adjusts the rotational speed of the motor 10 by adjusting the duty ratio of the PWM, and the motor 10 rotates the fan.

In using the related art air purifier, if the degree of filter contamination is high, the time duration during which the air purifier has been used is totaled, in order to determine when it is necessary to change the filter.

Thus, in the related art, an accurate degree of filter contamination cannot be determined, causing a problem in that the filter is unnecessarily changed, even if there is a lesser degree of filter contamination from a predetermined amount deemed necessary to warrant a filter change. Namely, even when filter's degree of contamination is lower than the predetermined unacceptable degree of filter contamination, the filter is changed unnecessarily, and in the case the degree of filter contamination is higher than the predetermined unacceptable degree of filter contamination, the filter is not changed, resulting in a situation whereby the filter cannot operate properly.

SUMMARY OF THE INVENTION

An aspect of the present invention provides a system and method for changing a filter provided in an air purifier at the correct time to thus use the air purifier more efficiently and maintain an optimum indoor environment.

According to an aspect of the present invention, there is provided a system for determining an air purifier filter change time, including: a motor speed measurement unit configured to measure the rotational speed of a motor that operates a filter provided in the air purifier; a time counting unit configured to count time starting from the point when the motor starts rotating upon receiving power supplied thereto or from the point when power supplied to the motor is cut off; a speed determination unit configured to check whether or not the rotational speed of the motor has reached a pre-set speed; a time comparison unit configured to receive information regarding recorded motor running time from the time counting unit and comparing the recorded motor running time to a pre-set time duration, if the speed determination unit determines that the rotational speed of the motor has reached the pre-set speed; and a filter change time determination unit configured to check whether or not filter change is required according to results obtained by comparing the time duration during which the rotational speed of the motor has reached the pre-set speed with the pre-set time duration.

The time counting unit may count time starting from the point when the motor starts to rotate upon receiving power supplied thereto, the pre-set speed may be a target speed, and if a time duration during which the rotational speed of the motor has reached the target speed is shorter than the pre-set time duration, the filter change time determination unit may determine that a filter change is required.

The system for determining an air purifier filter change time may further include: a power cutting unit configured to cut off the power supply to the motor if the rotational speed of the motor is equal to the pre-set speed, wherein if the power cutting unit cuts off the power supply to the motor, the time counting unit may count time starting from the point when the power supply to the motor is cut off, the speed determination unit may check whether or not the rotational speed of the motor has reached zero, and the time comparison unit may compare a time duration during which the rotational speed of the motor has reached zero with the pre-set time duration, and if the time duration during which the rotational speed of the motor has reached zero is longer than the pre-set time duration, the filter change time determination unit may determine that a filter change is required.

When a filter change is required, the filter change time determination unit may output a message informing about a filter change signal or an alarm signal to a display unit.

According to another aspect of the present invention, there is provided a method for determining an air purifier filter change time, including: measuring the rotational speed of a motor that operates a filter provided in an air purifier; counting time starting from the point when the motor starts to rotate upon receiving power supplied thereto or from the point when power supply to the motor is cut off; checking whether or not the rotational speed of the motor has reached a pre-set speed; if it is determined that the rotational speed of the motor has reached the pre-set speed, comparing the recorded motor running time to a pre-set time duration; and checking whether or not the filter is to be changed according to the result of the comparison obtained by comparing the time duration during which the rotational speed of the motor reached the pre-set speed with the pre-set time duration.

With regard to the recorded motor running time, time may be counted starting from the point when the motor starts to rotate upon receiving power supplied thereto, the pre-set speed may be a target speed, and in checking whether of not a filter change is required, if the time duration during which the rotational speed of the motor reached the target speed is shorter than the pre-set time duration, it may be determined that a filter change is required.

The method for determining an air purifier filter change time may further include: cutting off power supply to the motor if the rotational speed of the motor is the pre-set speed, wherein, in cutting off power supply to the motor, time may be counted starting from the point when the power supply to the motor is cut off, in checking whether or not the rotational speed of the motor has reached the pre-set speed, it may be determined whether or not the rotational speed of the motor has reached zero, in comparing the recorded motor running time with the pre-set time duration, a time duration during which the rotational speed of the motor has reached zero may be compared with the pre-set time duration, and in determining whether or not a filter change is required, if the time duration during which the rotational speed of the motor has reached zero is longer than the pre-set time duration, it may be determined that a filter change is required.

The method for determining a filter change time of an air purifier may further include: when a filter change is required, outputting a message informing about a filter change signal or an alarm signal to a display unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 2:
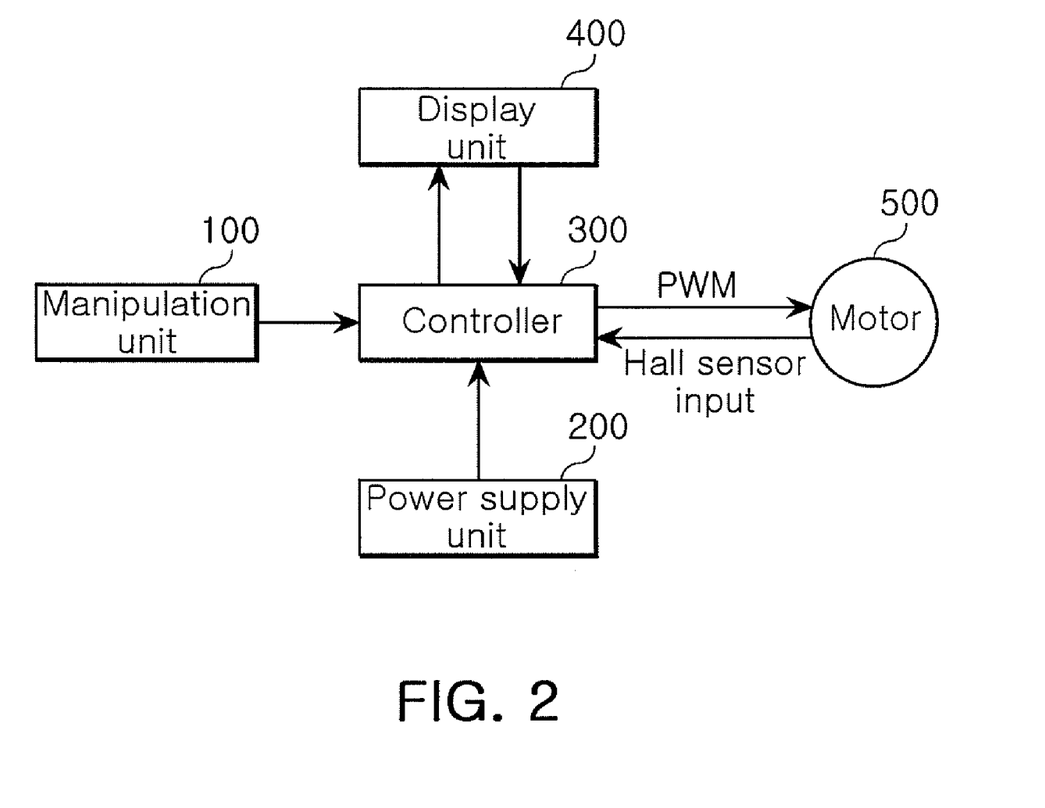
FIG. 2 is a schematic block diagram of a system for determining an air purifier filter change time using measurement of motor speed according to an exemplary embodiment of the present invention.
Figure 3:
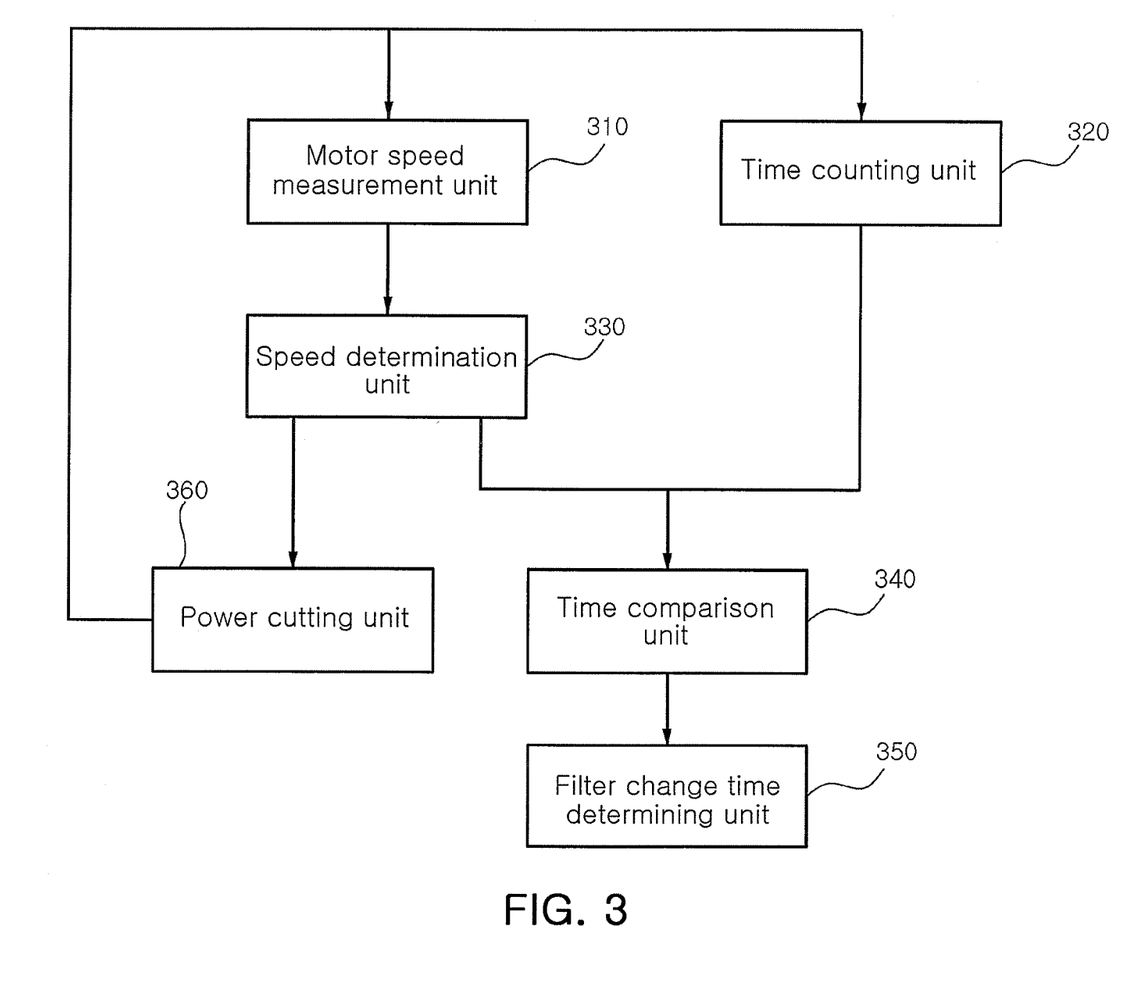
FIG. 3 is a schematic block diagram of a controller of the system of FIG. 2.

FIG. 2 is a schematic block diagram of a system for determining an air purifier filter change time using a measurement of motor speed according to an exemplary embodiment of the present invention, and FIG. 3 is a schematic block diagram of a controller of FIG. 2. As shown in FIGS. 2 and 3, the system for determining an air purifier filter change time using a measurement of the speed of a motor 500 may include a manipulation unit 100, a power supply unit 200, a controller 300, and a display unit 400. The controller 300 may include a motor speed measurement unit 310, a time counting unit 320, a speed determination unit 330, a time comparison unit 340, a filter change time determination unit 350, and a power cutting unit 360.

The manipulation unit 100 receives desired operation information (e.g., automatic operation or manual operation) and other manipulation signals from a user.

The power supply unit 200 supplies power to the air purifier and may include a rectifying unit for rectifying and smoothing AC power to supply DC power and an inverter for converting the DC power supplied from the rectifying unit into 3-phase AC power in a pulse form with a certain variable frequency and supplying the same to the motor.

The motor speed measurement unit 310 measures the rotational speed of the motor that operates a filter provided in the air purifier. The rotational speed of the motor is generally represented by revolutions per minute (rpm).

The time counting unit 320 starts to count time from the point when the motor starts to rotate upon receiving power supplied thereto or from the point when the power supplied to the motor is cut off.

The speed determination unit 330 checks whether or not the rotational speed of the motor has reached a pre-set speed.

If the speed determination unit 330 determines that the rotational speed of the motor has reached a pre-set speed, the time comparison unit 340 receives information regarding the time which has been counted by the time counting unit 320 and compares the recorded motor running time with a pre-set time duration.

The filter change time determination unit 350 checks whether or not a filter change is required according to the result of the comparison between the time duration during which the rotational speed of the motor has reached the pre-set speed and the pre-set time duration.

The system for determining an air purifier filter change time using a measurement of motor speed according to an exemplary embodiment of the present invention may perform its operation in two types of modes as follows.

In a first system mode, a filter change time is determined by counting the time duration during which the motor starts to rotate to reach a target speed. In a second mode of the system, a filter change time is determined by counting the time duration from a point when power supplied to the motor that rotates at the target speed is cut off to a point when the rotational speed of the motor reaches zero.

In the first mode, the time counting unit 320 counts time starting from a point when the motor rotates upon receiving power supplied thereto, and the speed determination unit 330 checks whether or not the rotational speed of the motor has reached the target speed. When the speed determination unit 330 determines that the rotational speed of the motor has reached the target speed, the time comparison unit 340 receives the information regarding the time duration which has been counted by the time counting unit 320 and compares it with the pre-set time duration. If the time duration during which the rotational speed of the motor has reached the target speed is shorter than the pre-set time duration, the filter change time determination unit 350 determines that a filter change is required, and outputs a message informing about a filter change signal, or an alarm signal to the display unit 400.

In the second mode, when the rotational speed of the motor is equal to the target speed, the power cutting unit 360 cuts off power supply to the motor and the time counting unit 320 starts to count time from this point. The speed determination unit 330 checks whether or not the rotational speed of the motor has reached zero. When the speed determination unit determines that the rotational speed of the motor has reached zero, the time comparison unit 340 receives information regarding the time duration which has been counted by the time counting unit 320 and compares it with the pre-set time duration. If the time duration during which the rotational speed of the motor reached zero is longer than the pre-set time duration, the filter change time determination unit 350 determines that a filter change is required, and outputs a message informing about a filter change signal, or an alarm signal to the display unit 400.

The display unit 400 displays the message or the alarm signal output from the filter change time determination unit 350 to inform the user that a filter change is required. The user then recognizes the filter needs to be changed through the message or the alarm signal, and may change the filter of the air purifier.

Figure 4:
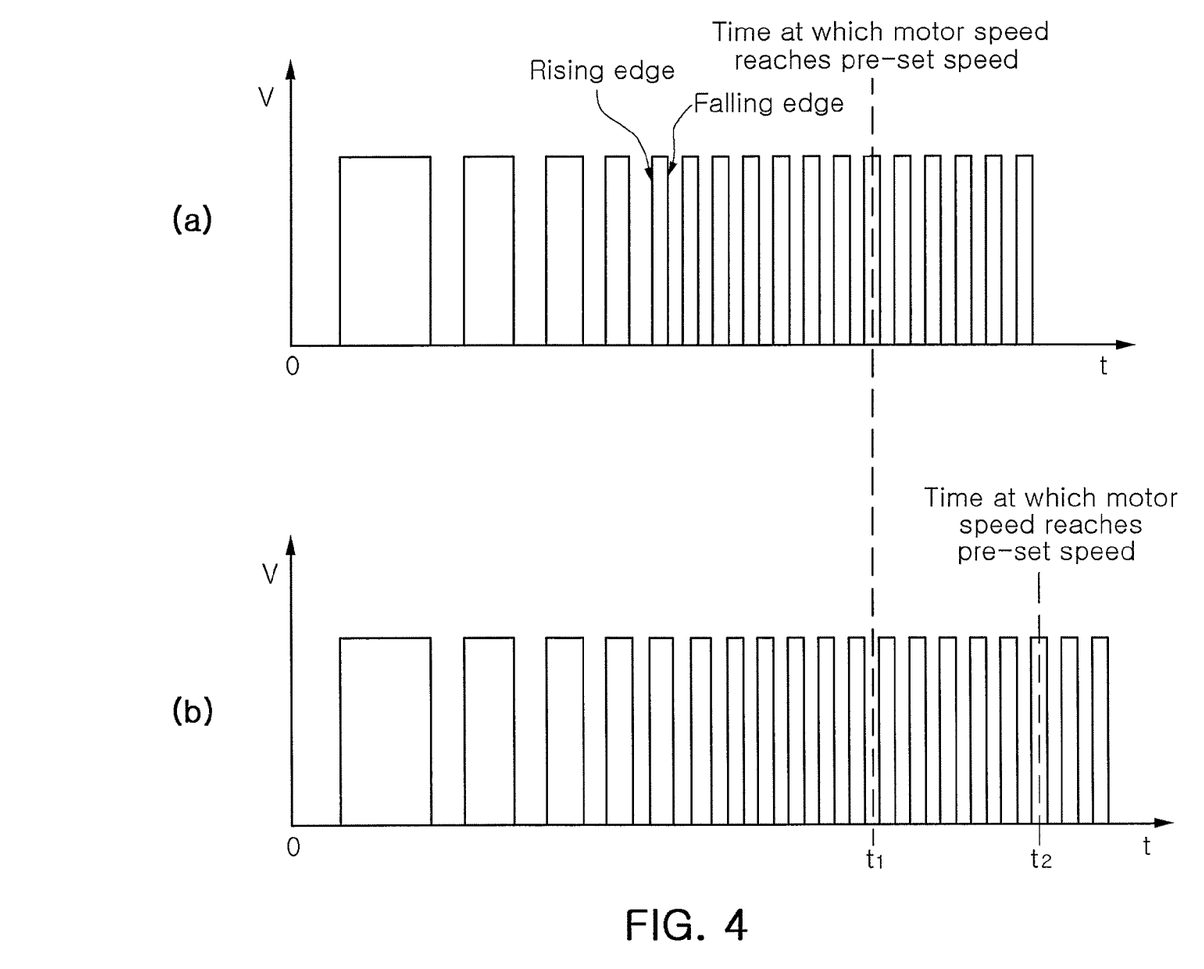
FIG. 4 illustrates graph (a) and graph (b) showing the comparison between a pulse signal generated by a motor provided in the air purifier when the filter has a high degree of contamination and a pulse signal generated by the motor when the filter has a low degree of contamination in a first mode according to an exemplary embodiment of the present invention.

Graph (a) and graph (b) of FIG. 4 show the comparison between a pulse signal generated by a motor provided in the air purifier when the filter has a high degree of contamination and a pulse signal generated by the motor when the filter has a low degree of contamination in the first mode according to an exemplary embodiment of the present invention. When the degree of filter contamination is high, a pulse signal as shown in graph (a) of FIG. 4 appears, whereas when the degree of filter contamination is low, a pulse signal as shown in graph (b) of FIG. 4 appears.

In graph (a) of FIG. 4, showing the case where the degree of filter contamination degree is high, the rotational speed of the motor has reached the target speed at a time $t_1$, and in graph (b) of FIG. 4, showing the case where the degree of filter contamination is low, the rotational speed of the motor has reached the target speed at a time $t_2$. It is to be noted that $t_1$ is smaller than $t_2$.

When the filter has a high degree of contamination, the amount of air introduced through the filter decreases, reducing the motor's load, whereas if the filter has a low degree of contamination, the amount of air introduced through the filter increases, increasing the motor's load. Thus, the time duration during which the rotational speed of the motor reaches the target speed can be counted by using the fact that the rotational speed of the motor varies depending on the load of the motor, to thus obtain measurement of filter change time (i.e., when the filter requires changing).

Figure 5:
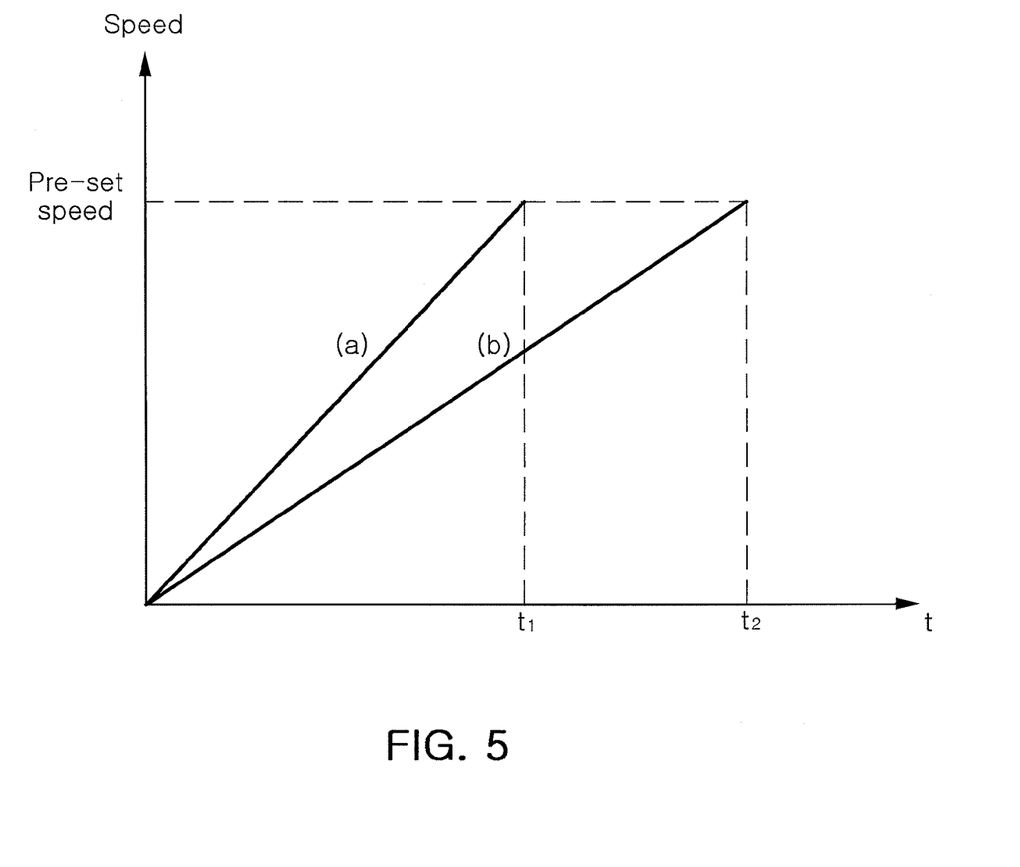
FIG. 5 is a graph showing the comparison between time durations during which the rotational speed of the motor has reached a target speed when the filter has a high degree of contamination and when the filter has a low degree of contamination in the first mode according to an exemplary embodiment of the present invention.

FIG. 5 is a graph showing the comparison between time durations during which the rotational speed of the motor has reached the target speed when the filter has a high degree of contamination and when the filter has a low degree of contamination in the first mode according to an exemplary embodiment of the present invention. As shown in FIG. 5, when the filter has a high degree of contamination, the time duration during which the rotational speed has reached the target speed is $t_1$ as indicated by (a), and when the filter has a low degree of contamination, a time duration during which the rotational speed has reached the target speed is $t_2$ as indicated by (b). In this case, because $t_1$ is smaller than $t_2$, it can be noted that the time duration during which the motor has reached the target speed when the filter has a high degree of contamination is shorter than the time duration during which the motor has reached the target speed when the filter has a low degree of contamination.

Thus, in the air purifier according to an exemplary embodiment of the present invention, with the knowledge of the filter contamination degree corresponding to a time at which the filter is to be changed, optimum filter change time can be determined by counting the time duration during which the rotational speed of the motor reaches the target speed.

Figure 6:
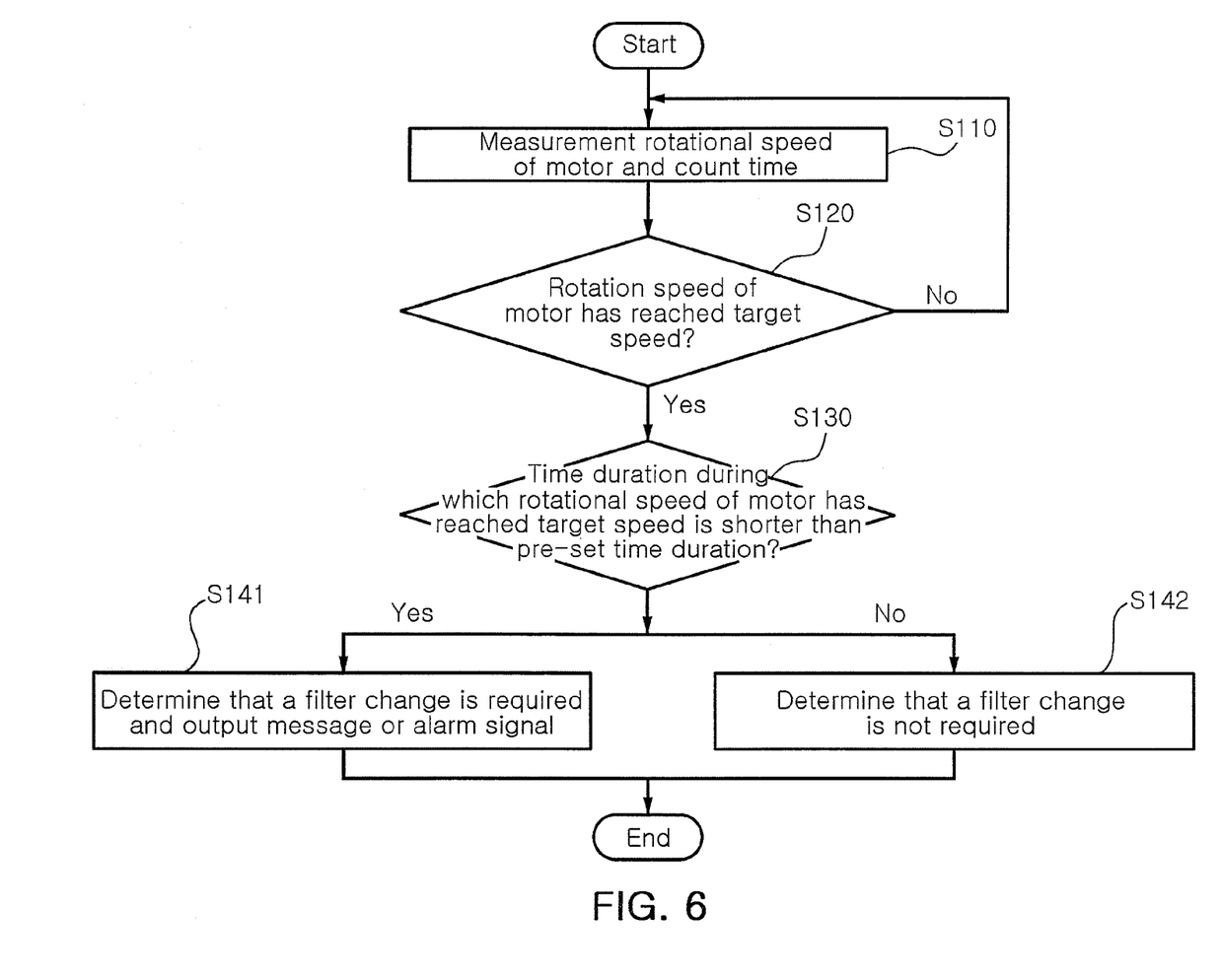
FIG. 6 is a flow chart illustrating the process of a method for determining a filter change time of an air purifier using a measurement of motor speed in the first mode.

FIG. 6 is a flow chart illustrating the process of a method for determining an air purifier filter change time using a measurement of motor speed in the first mode. The method for determining an air purifier filter change time using a measurement of motor speed will now be described with reference to FIGS. 2, 3, and 6.

First, the motor speed measurement unit 310 measures the rotational speed of the motor that operates the filter provided in the air purifier, and from the point of time when the motor starts to rotate, the time counting unit 320 starts to count time (S110). The rotational speed of the motor is represented by revolutions per minute (rpm).

Next, the speed determination unit 330 checks whether or not the rotational speed of the motor has reached the target speed (S120).

The time comparison unit 340 then compares the time duration during which the rotational speed of the motor reaches the target speed with the pre-set time duration (S130).

Thereafter, if the time duration during which the rotational speed of the motor has reached the target speed is less than the pre-set time duration, the filter change time determination unit 350 determines that a filter change is required, and outputs a message informing about a filter change signal, or an alarm signal to the display unit (S141). If, however, the time duration during which the rotational speed of the motor has reached the target speed is longer than or equal to the pre-set time duration, the filter change time determination unit 350 determines that a filter change is not required (S142).

When the filter has a high degree of contamination, the amount of air introduced through the filter decreases, reducing the motor's load, whereas if the filter has a low degree of contamination, the amount of air introduced through the filter increases, increasing the motor's load. Thus, information concerning the optimum filter change time can be obtained (known) by counting the time duration during which the rotational speed of the motor reaches the target speed by using the fact that the rotational speed of the motor varies, depending on the motor's load.

Figure 7:
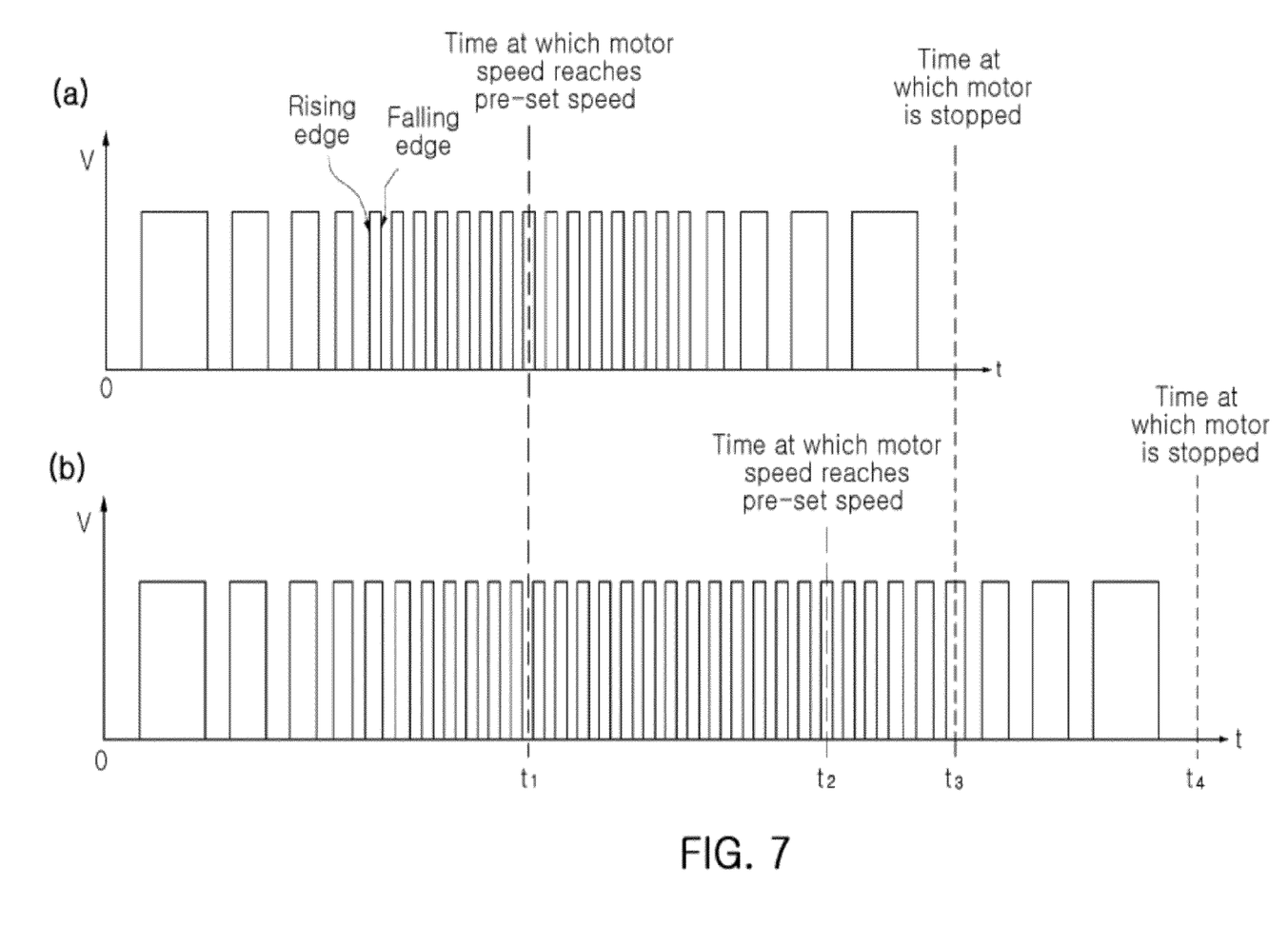
FIG. 7 illustrates graph (a) and graph (b) showing the comparison between a pulse signal generated by a motor provided in the air purifier when the filter has a high degree of contamination and a pulse signal generated by the motor when the filter has a low degree of contamination in a second mode according to an exemplary embodiment of the present invention.

Graph (a) and graph (b) of FIG. 7 show a comparison between a pulse signal generated by the motor provided in the air purifier when the filter has a high degree of contamination and a pulse signal generated by the motor when the filter has a low degree of contamination in the second mode according to an exemplary embodiment of the present invention. When the degree of filter contamination is high, a pulse signal as shown in graph (a) of FIG. 7 appears, whereas when the degree of filter contamination is low, a pulse signal as shown in graph (b) of FIG. 7 appears.

In Graph (a) of FIG. 7, showing the case where the degree of filter contamination degree is high, the rotational speed of the motor has reached the target speed at a time $t_1$. In this case, when the power supply to the motor is cut off, the motor decelerates and the rotation of the motor reaches zero at a time $t_3$.

In graph (b) of FIG. 7, showing the case where the degree of filter contamination is low, the rotational speed of the motor has reached the target speed at a time $t_2$. In this case, when the power supply to the motor is cut off, the motor decelerates and the rotation of the motor reaches zero at a time $t_4$.

Through the graph (a) and graph (b) of FIG. 7, it is noted that the time duration from the time $t_1$, at which the rotational speed of the motor has reached the target speed, to the time $t_3$ at which the rotational speed of the motor has reached zero, is longer than the time duration from the time $t_2$ at which the rotational speed of the motor has reached the target speed to the time $t_4$ at which the rotational speed of the motor has reached zero.

When the filter has a high degree of contamination, the amount of air introduced through the filter decreases, reducing the motor's load, whereas if the filter has a low degree of contamination, the amount of air introduced through the filter increases, increasing the motor's load. Thus, the optimum time for filter changes can be obtained (known) by counting the time duration during which the rotational speed of the motor reaches zero by using the fact that the rotational speed of the motor varies depending on the load of the motor.

Figure 8:
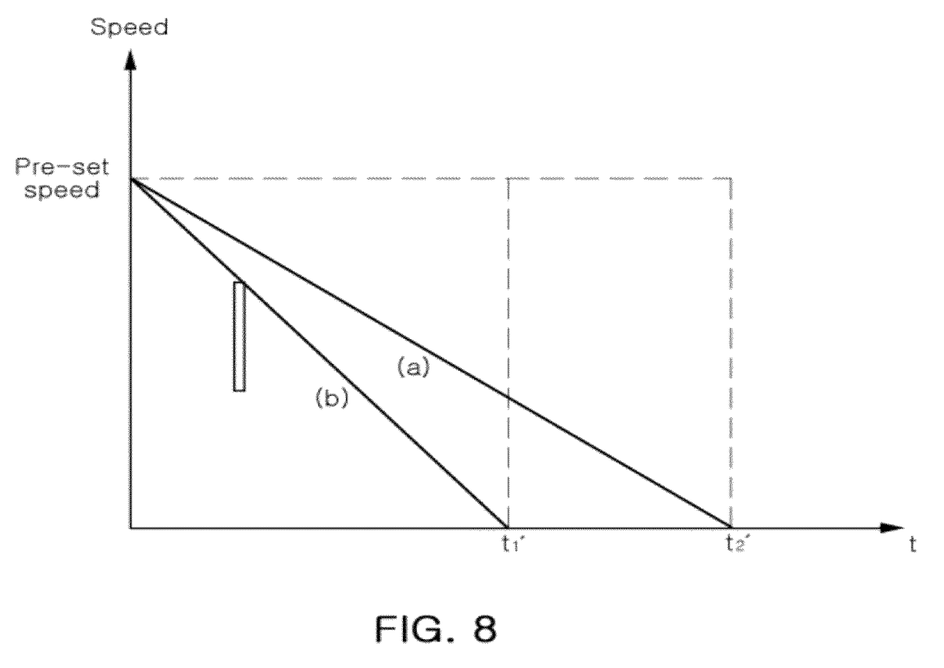
FIG. 8 is a graph showing the comparison between a time duration during which a rotational speed of the motor reaches zero when the filter has a high degree of contamination and a time duration during which the rotational speed of the motor reaches zero when the filter has a low degree of contamination in the second mode according to an exemplary embodiment of the present invention.

FIG. 8 is a graph showing the comparison between a time duration during which the rotational speed of the motor reaches zero when the filter has a high degree of contamination and the time duration during which the rotational speed of the motor reaches zero when the filter has a low degree of contamination in the second mode according to an exemplary embodiment of the present invention. As shown in FIG. 8, when the filter has a high degree of contamination, the time duration during which a rotational speed of the motor reaches zero from the target speed is $t_2'$ as indicated by (a), and when the filter has a low degree of contamination, the time duration during which the rotational speed of the motor reaches zero from the target speed is $t_1'$ as indicated by (b). In this case, because $t_1'$ is smaller than $t_2'$, it can be noted that the time duration during which the rotational speed of the motor reaches zero is longer when the filter has the high degree of contamination than when the filter has the low degree of contamination.

Thus, in the air purifier according to an exemplary embodiment of the present invention, with the knowledge of the degree of filter contamination corresponding to a time at which the filter is to be changed, the optimum time for filter changes can be determined by counting the time duration during which the rotational speed of the motor reaches zero.

Figure 9:
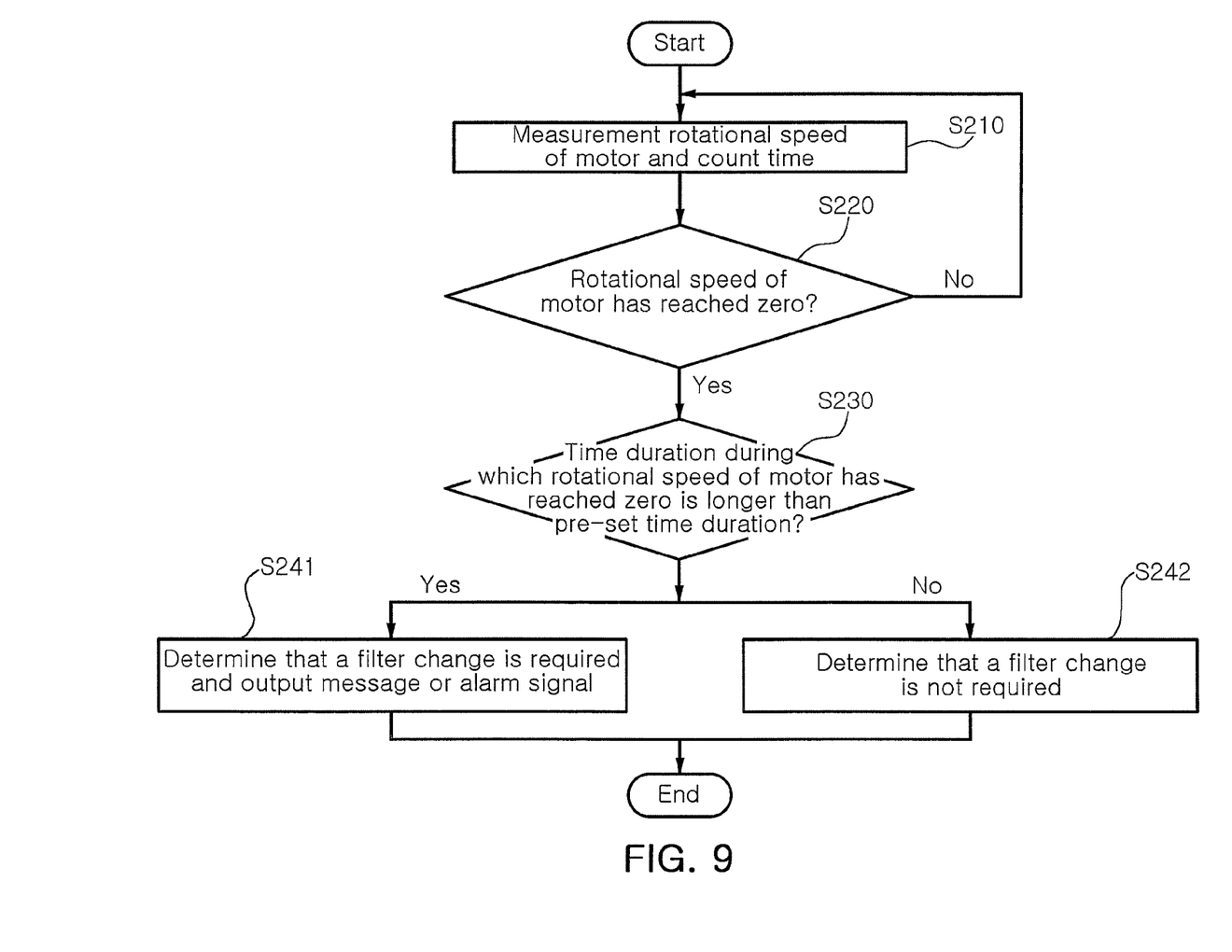
FIG. 9 is a flow chart illustrating the process of a method for determining an air purifier filter change time using a measurement of motor speed in the second mode.

FIG. 9 is a flow chart illustrating the process of a method for determining an air purifier filter change time using a measurement of motor speed in the second mode. The method for determining an air purifier filter change time using a measurement of motor speed will now be described with reference to FIGS. 2, 3, and 9.

First, the motor speed measurement unit 310 measures the rotational speed of the motor that operates the filter provided in the air purifier, and from the point of time when power is cut off by the power cutting unit 360 in a state in which the motor is rotating at the target speed, the time counting unit 320 starts to count time (S210). The rotational speed of the motor is represented by revolutions per minute (rpm).

Next, the speed determination unit 330 checks whether or not the rotational speed of the motor has reached zero (S220).

The time comparison unit 340 then compares the time duration during which the rotational speed of the motor has reached zero with the pre-set time duration (S230).

Thereafter, if the time duration during which the rotational speed of the motor has reached zero is longer than the pre-set time duration, the filter change time determination unit 350 determines that a filter change is required, and outputs a message informing about a filter change signal, or an alarm signal to the display unit (S241). If, however, the time duration during which the rotational speed of the motor has reached zero is shorter than or the same as the pre-set time duration, the filter change time determination unit 350 determines that a filter change is not required (S242).

When the filter has a high degree of contamination, the amount of air introduced through the filter decreases, reducing the motor's load, whereas if the filter has a low degree of contamination, the amount of air introduced through the filter increases, increasing the motor's load. Thus, the optimum time for filter changes can be obtained (known) by counting the time duration during which the rotational speed of the motor reaches zero by using the fact that the rotational speed of the motor varies depending on the load of the motor.

As set forth above, according to exemplary embodiments of the invention, the filter provided in the air purifier can be changed at a proper time, so the air purifier can be effectively used and thus an agreeable indoor environment can be maintained.

In addition, because the filter provided in the air purifier is changed by checking the degree of filter contamination, the filter is not wasted and the air purifying capacity of the filter is not degraded.

While the present invention has been shown and described in connection with the exemplary embodiments, it will be apparent to those skilled in the art that modifications and variations can be made without departing from the spirit and scope of the invention as defined by the appended claims.

What is claimed is:

1. A system for determining an air purifier filter change time, the system comprising:
   a motor speed measurement unit configured to measure a rotational speed of a motor that operates a filter provided in the air purifier;
   a time counting unit configured to count time starting from the point when the motor starts rotating upon receiving power supplied thereto or from a point when power supplied to the motor is cut off;
   a speed determination unit configured to check whether or not the rotational speed of the motor has reached a pre-set speed;
   a time comparison unit configured to receive information regarding recorded motor running time from the time counting unit and comparing the recorded motor running time to a pre-set time duration, if the speed determination unit determines that the rotational speed of the motor has reached the pre-set speed; and
   a filter change time determination unit configured to check whether or not a filter change is required according to results obtained by comparing the time duration during which the rotational speed of the motor has reached the pre-set speed with the pre-set time duration.

2. The system of claim 1, wherein the time counting unit counts time starting from the point when the motor starts to rotate upon receiving power supplied thereto, the pre-set speed is a target speed, and if a time duration during which the rotational speed of the motor has reached the target speed is shorter than the pre-set time duration, the filter change time determination unit determined that a filter change is required.

3. The system of claim 1, further comprising:
   a power cutting unit configured to cut off the power supply to the motor if the rotational speed of the motor is equal to the pre-set speed,
   wherein if the power cutting unit cuts off the power supply to the motor, the time counting unit counts time starting from the point when the power supply to the motor is cut off, the speed determination unit checks whether or not the rotational speed of the motor has reached zero, and the time comparison unit compares a time duration during which the rotational speed of the motor has reached zero with the pre-set time duration, and if the time duration during which the rotational speed of the motor has reached zero is longer than the pre-set time duration, the filter change time determination unit determines that a filter change is required.

4. The system of claim 1, wherein when a filter change is required, the filter change time determination unit outputs a message informing about a filter change signal, or an alarm signal to a display unit.

5. A method for determining an air purifier filter change time, the method comprising:
   measuring the rotational speed of a motor that operates a filter provided in an air purifier;
   counting time starting from the point when the motor starts to rotate upon receiving power supplied thereto or from the point when power supply to the motor is cut off;
   checking whether or not the rotational speed of the motor has reached a pre-set speed;
   if it is determined that the rotational speed of the motor has reached the pre-set speed, comparing the recorded motor running time to a pre-set time duration; and
   checking whether or not the filter is to be changed according to the result of the comparison obtained by comparing the time duration during which the rotational speed of the motor reached the pre-set speed with the pre-set time duration.

6. The method of claim 5, wherein, with regard to the recorded motor running time, time is counted starting from a point when the motor starts to rotate upon receiving power supplied thereto, the pre-set speed is a target speed, and in checking whether of not a filter change is required, if the time duration during which the rotational speed of the motor reached the target speed is shorter than the pre-set time duration, it is determined that a filter change is required.

7. The method of claim 5, further comprising:
   cutting off power supply to the motor if the rotational speed of the motor is the pre-set speed,
   wherein, in cutting off power supply to the motor, time is counted starting from the point when the power supply to the motor is cut off, in checking whether or not the rotational speed of the motor has reached the pre-set speed, it is checked whether or not the rotational speed of the motor has reached zero, in comparing the recorded motor running time with the pre-set time duration, a time duration during which the rotational speed of the motor has reached zero is compared with the pre-set time duration, and in determining whether or not a filter change is required, if the time duration during which the rotational speed of the motor has reached zero is longer than the pre-set time duration, it is determined that a filter change is required.

8. The method of claim 5, further comprising:
   when a filter change is required, outputting a message informing about a filter change signal, or an alarm signal to a display unit.

* * * * *